US008210969B2

(12) United States Patent
Clancy

(10) Patent No.: US 8,210,969 B2
(45) Date of Patent: Jul. 3, 2012

(54) ERGONOMIC SPORTS HANDLE

(76) Inventor: Brian T. Clancy, Oxford, MI (US)

( * ) Notice: Subject to any disclaimer, the term of this patent is extended or adjusted under 35 U.S.C. 154(b) by 0 days.

(21) Appl. No.: 12/615,055

(22) Filed: Nov. 9, 2009

(65) Prior Publication Data

US 2010/0120560 A1 May 13, 2010

Related U.S. Application Data

(60) Provisional application No. 61/112,484, filed on Nov. 7, 2008.

(51) Int. Cl.

| | |
|---|---|
| ***A63B 49/08*** | (2006.01) |
| ***A63B 59/00*** | (2006.01) |
| ***A63B 53/14*** | (2006.01) |
| ***A01K 87/08*** | (2006.01) |

(52) U.S. Cl. ........ 473/551; 473/549; 473/564; 473/513; 473/300; 43/18.1 R

(58) Field of Classification Search .................. 473/549, 473/551, 300, 302, 564, 568, 505, 513, 298; 43/18.1 R; D10/134, 137, 142
See application file for complete search history.

(56) References Cited

U.S. PATENT DOCUMENTS

| | | | | |
|---|---|---|---|---|
| 489,511 | A * | 1/1893 | Terpening | 403/365 |
| 4,038,719 | A * | 8/1977 | Bennett | 16/430 |
| 4,360,201 | A * | 11/1982 | Biehl et al. | 473/526 |
| 4,759,546 | A * | 7/1988 | Steele, Jr. | 473/526 |
| 5,482,072 | A * | 1/1996 | Cimino | 135/72 |
| 5,692,265 | A * | 12/1997 | Dalury | 16/430 |
| 6,083,125 | A * | 7/2000 | West | 473/549 |
| 7,264,563 | B2 * | 9/2007 | Dahm | 473/549 |
| 7,553,246 | B2 * | 6/2009 | Turzer | 473/549 |
| 2010/0120560 | A1 * | 5/2010 | Clancy | 473/551 |

* cited by examiner

*Primary Examiner* — Raleigh W. Chiu
(74) *Attorney, Agent, or Firm* — John A. Artz; Dickinson Wright PLLC

(57) ABSTRACT

A sports utility handle is provided for use with a sports equipment shaft including an upper shaft surface having an upper shaft plane, a lower shaft surface having a lower shaft plane, two side shaft surfaces having side surface planes and a shaft centerline. The handle includes a shaft engagement end, a handle termination end opposite thereto, an upper handle surface, a lower handle surface comprising a lower surface spline extending inwards from the lower shaft plane towards the upper shaft plane in a first lower handle surface beginning at the shaft engagement end. The lower surface spline extending outwards in the lower shaft plane direction in a second lower handle surface beginning at the first lower handle surface and extending towards the handle termination end. A curved stop element runs between the upper handle surface towards the lower handle surface at the handle termination end and is sized to fit within a human palm. Two handle side surfaces run generally parallel to the two side shaft surfaces. The lower surface spline is configured to provide a relaxed wrist grip such that the shaft centerline is generally aligned with a user forearm centerline.

17 Claims, 3 Drawing Sheets

ERGONOMIC SPORTS HANDLE

CROSS-REFERENCE TO RELATED APPLICATIONS

The present application is a non-provisional of U.S. Application No. 61/112,484 filed Nov. 7, 2008.

TECHNICAL FIELD

The present invention relates generally to a handle for sports equipment, and more particularly concerns a handle providing ergonomic and performance improvements to traditional sports equipment.

BACKGROUND

Ever since the mastery of the concept of tools, humanity has sought to improve or augment human performance through the use of external objects. In its original forms, this pursuit was directed towards utility devices such as levers, hammers, and other tools that aided survival and success. As society and civilization progressed individuals found they had the time and energy to engage in entertainment activities such as sports. Sporting activities naturally made use of tools to implement or facilitate novel play. These tools have developed over the years into well known devices such as bats, rackets, sticks, etc. Often it is these tool based sporting goods that drive the very nature of athletic performance and therefore the direction of the sport itself.

Recent developments in sporting goods have commonly turned to the development or utilization of high tech materials. Considerable design effort has been expended to make devices stronger, lighter, more or less flexible, and more durable. The principles behind this direction in sports innovation have lead many in the industry to believe the future of traditional sporting goods lies in the introduction of new and improved materials to traditional designs. What the improved material theories fail to address is the fundamental limitations of the traditional designs they seek to improve. A new approach towards rethinking traditional design shapes may produce more significant improvements than the application of material sciences.

One arena in which traditional sporting and utility tools are lacking stems from a failure to apply decades of knowledge of the human body to age old designs. Often the tools or sports equipment retain designs that are offshoots from the simple sticks from which they were originally formed. As such they largely remain straight shafts with only the most minor modifications. Players or other users must grip the straight shaft from the side. This commonly places the users wrist in a strained position which in turn hampers performance and causes undue stress on the user. In addition, a traditional side gripping stance places the centreline of the user's forearm on an angle to the centreline of the engaged shaft. This non-linear grip approach prevents the shaft from acting as a true extension of the users arm. The brain and body must compensate for the lack of linear extension constantly during usage of the shaft. This not only adds undue stress to the player but also acts a limiter to the true freedom of motion granted to human form.

It would be advantageous to have ergonomic handle design that would allow athletes to perform with a reduction of stress as well as a more liberal freedom of motion they already experience in their own limbs.

SUMMARY OF THE INVENTION

A sports utility handle is provided for use with a sports equipment shaft including an upper shaft surface having an upper shaft plane, a lower shaft surface having a lower shaft plane, two side shaft surfaces having side surface planes and a shaft centerline. The handle includes a shaft engagement end, a handle termination end opposite thereto, an upper handle surface, a lower handle surface comprising a lower surface spline extending inwards from the lower shaft plane towards the upper shaft plane in a first lower handle surface beginning at the shaft engagement end. The lower surface spline extending outwards in the lower shaft plane direction in a second lower handle surface beginning at the first lower handle surface and extending towards the handle termination end. A curved stop element runs between the upper handle surface towards the lower handle surface at the handle termination end and is sized to fit within a human palm. Two handle side surfaces run generally parallel to the two side shaft surfaces. The lower surface spline is configured to provide a relaxed wrist grip such that the shaft centerline is generally aligned with a user forearm centerline.

The present invention has advantages by providing a reduced user stress and increased performance efficiency during operation of the sports equipment in addition to providing an improved range of motion for the operator. The present invention accomplishes this through a unique shape that aligns the forearm with the operational stick centerline.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION

In the following description, various operating parameters and components are described for one or more constructed embodiments. These specific parameters and components are included as examples and are not meant to be limiting.

Figure 1:
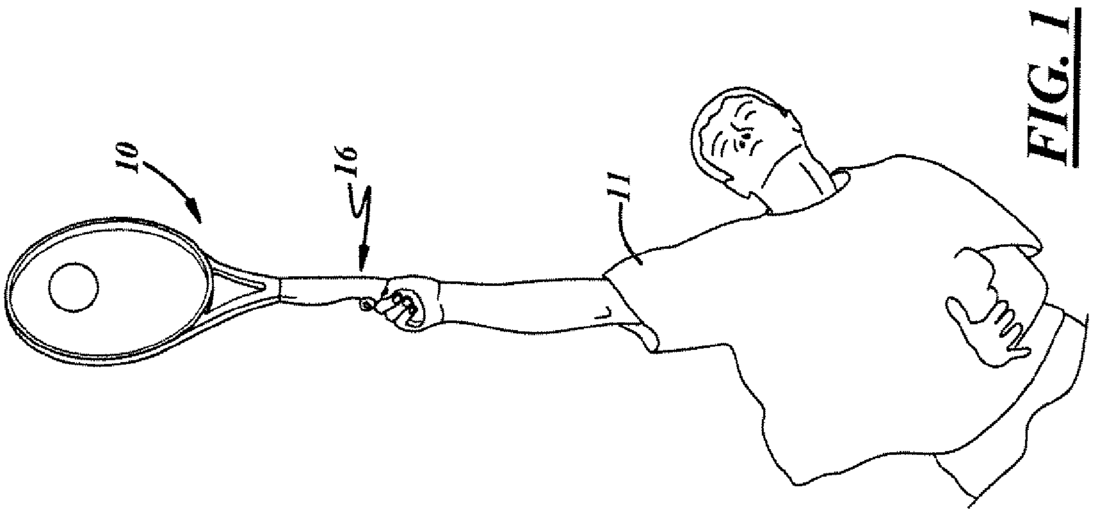
FIG. 1 is an illustration of an ergonomic sports handle in accordance with the present invention, the ergonomics sports handle illustrated gripped by an athlete.
Figure 3:
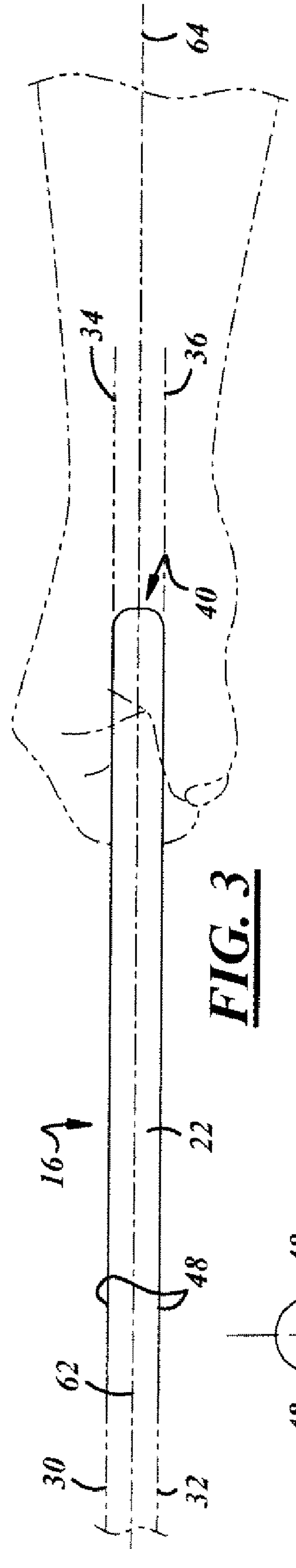
FIG. 3 is a top view illustration of the ergonomic sports handle illustrated in FIG. 2.
Figure 4:
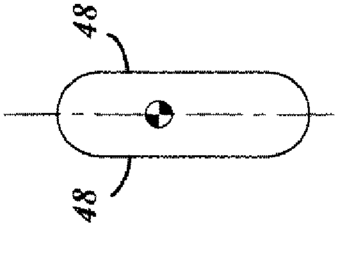
FIG. 4 is an end view of the ergonomic sports handle illustrated in FIGS. 2 and 3.
Figure 2:
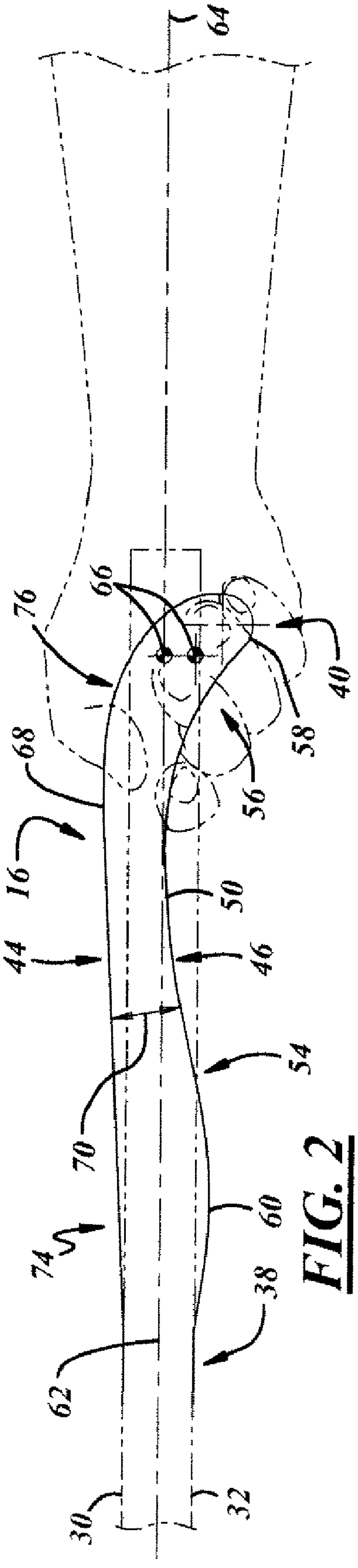
FIG. 2 is a detail illustration of the ergonomic sports handle illustrated in FIG. 1, the ergonomic sports handle illustrated from a center line side view.

FIG. 1 is an illustration of a piece of sporting goods equipment 10 in accordance with the present invention, the equipment being held by an athlete 11 during play. The sporting goods equipment 10 is illustrated as a tennis racket, but as will be understood by way of this disclosure, the present invention is applicable to a wide range of sports and sporting good equipment 10. The present invention, however, significantly diverges from known sports equipment in that if further includes an ergonomic handle 16. The ergonomic handle 16 may be formed as a unitary piece with the equipment 10 or may be formed as an independent element to be added to an existing piece of equipment 10. As seen in FIGS. 2 through 4, the ergonomic handle 16 may be comprised of a main handle body 18. The ergonomic handle 16 is intended to integrate with a shaft portion 12 of the piece of equipment 10.

The shaft portion 12 is comprised of a an upper shaft surface 22 having an upper shaft plane 24, a lower shaft surface 26 having a lower shaft plane 28 (FIG. 2) and two side shaft surfaces 30, 32 having side surface planes 34, 36 (FIG. 3), It should be understood that the use of the term planes is for reference purposes and is not intended to limit the shaft portion 12 to flat surfaces. In the case of cylindrical or oval cross-sections it is contemplated that the planes may be referenced by the tangent of the upper most point, the lower most point, and the farthest side points respectively (see FIGS. 7-9). As can be seen in FIGS. 2 and 3, the shaft surfaces 22,26,30,32 may be extended to provide a reference for the unique configuration of the handle body 18.

The handle body 18 is comprised of a shaft integration end 38 and a handle termination end 40 opposite the shaft integration end 38. The shaft integration end 38 may simply be the end of the handle body 18 wherein it merges into a uniform cross section of the shaft 12 when discussing unitary assemblies. The handle body 18 is further comprised of an upper handle surface 44, a lower handle surface 46 and two handle side surfaces 48. It is contemplated that the lower handle surface 46 is comprised of a lower surface spline 50 extending inwards from the lower shaft plane 28 towards the upper shaft plane 24 in a first lower handle surface portion 54 nearest the shaft integration end 38. In a second lower handle surface portion 56 nearest the handle termination end 40, the lower surface spline 50 extends outwards back away from the upper shaft plane 50 so as to form a concave gripping surface. The lower surface spline 50 ends in a rounded downward protrusion portion 58 that acts as a natural stop feel during performance as well as an end grip. The rounded downward protrusion portion 58 is preferably sized to fit within a human palm such that the equipment 10 does not vary enough from the original shape to pose challenges to existing rules or conventions. In addition, by sizing the downward protrusion portion 58 to fit within a human palm allows an improved gripping position with increased performance and comfort. Although a purely concave lower surface spline 50 may be utilized, it is contemplated that an s-shaped lower surface spline 50 may be utilized such than an initial downward bulge 60 abuts the shaft integration end 38 to act as a lower hand stop during performance. The lower surface spline 50 is configured such that it provides a relaxed wrist grip and such that the shaft centreline 62 is generally aligned with a user forearm centreline 64 (see FIGS. 2 and 3).

It is contemplated that the lower surface spline 50 in the second handle surface portion 56 (along with a complimentary section of the upper surface spline 68) is configured such that the users wrist is rotated less than 20 to 30 degrees (approximately) to reduce strain and improve performance. The rotation angle is preferably determined by measuring the angle of the wrist rotation about the forearm centreline 64 with zero degrees achieved when the palm center 66 is in line with the forearm centreline 64. In addition, the rounded downward protrusion portion 58 engages the approximate palm centre 66 when gripped. Although it is contemplated that the palm centre 66 will remain close to the forearm centreline 64 in one embodiment, in another it is contemplated to drop approximately 0.5 inches to accommodate a greater wrist angle. Another way to describe the same structure is that the lower surface spline 50 in the second handle surface portion 56 is configured to maintain a wrist rotation of less than 20 or 30 degrees while keeping the forearm centreline 64 parallel with the shaft centreline 62. The first handle surface portion 54 is then configured to move upwards from the shaft centreline 62 until the forearm centreline 64 is approximately in line with the shaft centreline. In still another method of describing the lower surface spline 50 is that the second handle surface portion 56 is configured for proper ease of grip and then the lower surface spline is raised until the shaft centreline 62 and the forearm centreline 64 are approximately aligned. This results in an approximate rise of four degrees of the upper surface spline 68 away from the upper shaft plane 24. These are simply additional ways of describing the unique geometry of the present invention.

It is preferable that the palm center 66 is maintained above or at the lower shaft plane 28. This both relaxes the wrist as well as bringing up the forearm centreline 64 to approximately be in line with the shaft centreline 62. An upper surface spline 68 generally parallels the lower surface spline 50 so as to maintain shaft handle depth 70 to a value suitable for gripping. Therefore the upper surface spline 68 is convex in nature extending away from the upper shaft plane 24 near the shaft integration end 38 and returning to and dropping below the upper shaft plane 24 and the rounded downward protrusion portion 58. The upper surface spline 68 preferably extends from the upper shaft plane 24 in a direction away from the lower shaft plane 26 in a first upper handle surface portion 74 (corresponding to the first lower handle surface portion 54) and extending back in the upper shaft plane 24 direction in a second upper handle surface portion 76 (corresponding to the second lower handle surface portion 56).

The advantage of the present configuration is that it eliminates or minimizes the arc of wrist movement present in conventional handles by moving the rotation center of wrist and forearm to align with the shaft centreline 62. This drastically changes the feel and control during play such that an previously unknown range of new control is provided. It is contemplated that the downward portion 58 does not protrude below the lower shaft plane 28 by more than the original shaft depth 72 so as to not negatively impact the shaft profile. The rounded downward protrusion portion 58 and the initial downward bulge 60 act as natural stops for the users grip such that the equipment 10 may be passed between hands during play without concern for loss or proper hand placement. This allows a previously unknown level of ambidextrous play also never realized before in the sport. These advantages along with untold others are provided by this unique and novel ergonomic handle design. It should be understood that a wide variety of modifications would be motivated by the present disclosure.

Figure 5:
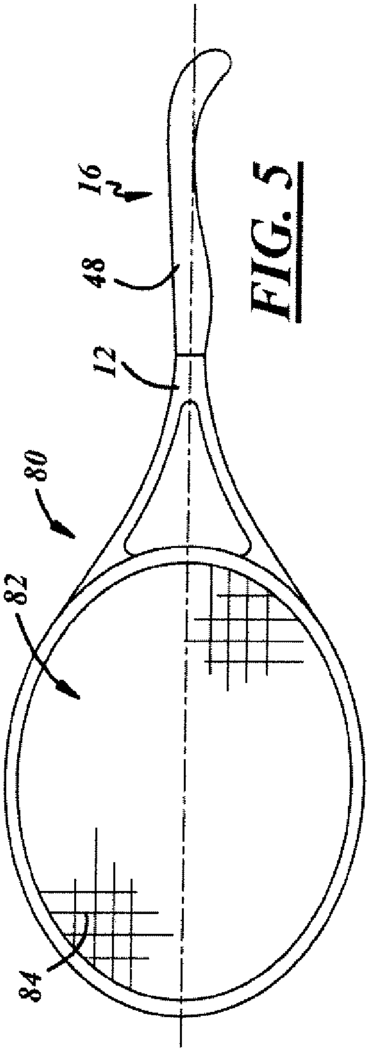
FIG. 5 is an illustration of the ergonomic sports handle illustrated in FIGS. 2 and 3, the ergonomic sports handle illustrated integrated into a tennis racket.

Referring now to FIG. 5 which is an illustration of the ergonomic sports handle 16 as integrated into a tennis racket 80. In this embodiment, it is preferable that the handle side surfaces 48 are aligned with the racket face 82 containing netting 84. As will be understood, the tennis racket is gripped with the rounded downward protrusion 58 towards the ground. Since the shaft centreline 62 is aligned with the forearm centreline 64 as discussed before, the tennis racket 80 provides improved single hand performance. When utilized with flat handle side surfaces 48 as shown in FIG. 4, the ergonomic sports handle 16 provides a natural and direct connection between the users hand and the angle of the racket face 82. In this fashion, the athlete 11 is constantly aware of the precise angle of the racket face 82 with relation to his wrist even when transferring the racket 80 during play between hands. This improved adds an additional subconscious orientation and muscle memory during usage. It is contemplated that even in sports where the ergonomic sports handle 16 may not be officially recognized for professional play, it may be used to build muscle memory during practice as well as used by amateurs.

Figure 6:
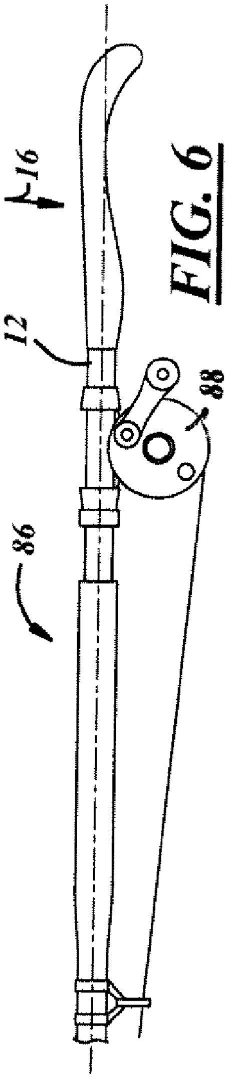
FIG. 6 is an illustration of the ergonomic sports handle illustrated in FIGS. 2 and 3, the ergonomic sports handle illustrated integrated into a fishing rod.

Referring now to FIG. 6 which is an illustration of the ergonomic sports handle 16 as integrated into a fishing rod 86. The alignment of the shaft centreline 62 with the forearm centreline 64 in addition to the relaxed wrist orientation allows for increased casting duration and performance. In addition when utilized with utilized with flat handle side surfaces 48 as shown in FIG. 4, the ergonomic sports handle 16 provides a natural and direct connection between the users hand and the fishing rod reel 88. This allows a fisherman to make casts and engage the reel 88 without looking down. After a short usage the hand will automatically find the reel 88 due to the unique shape of the handle 16.

Figure 7:
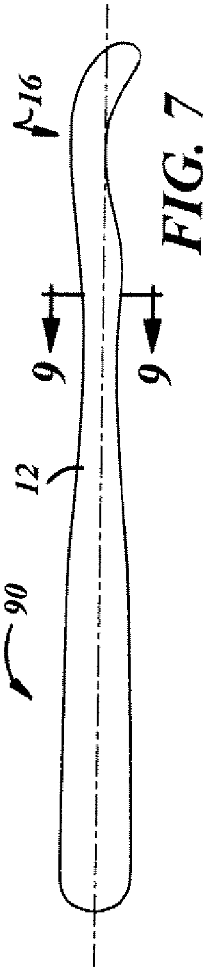
FIG. 7 is an illustration of the ergonomic sports handle illustrated in FIGS. 2 and 3, the ergonomic sports handle illustrated integrated into a baseball bat.
Figure 8:
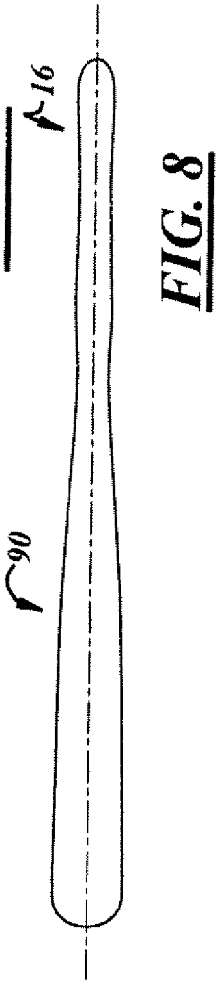
FIG. 8 is a top view illustration of the baseball bat illustrated in FIG. 7.
Figure 9:
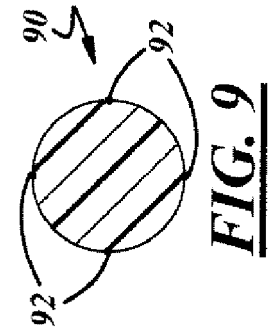
FIG. 9 is a cross-sectional illustration of the ergonomic sports handle illustrated in FIG. 7 as integrated with a baseball bat.

Referring now to FIGS. 7-9 which are illustrations of the ergonomic sports handle 16 as integrated into a baseball bat 90. In this embodiment, it is contemplated that the cross-section of the sports handle 16 will be spherical or elliptical as illustrated in FIG. 9. In this embodiment, it should be understood that the use of the terms shaft planes 24,28, 34, 36 are comprised of a plane formed by the outermost edge point of the bat 90 in the appropriate direction. Although the baseball bat 90 is typically continuously tapered, the shape of the ergonomic handle 16 allows for a clear indication of where it begins and thus where the shaft points 92 are determined. By aligning planes parallel to the shaft centreline 62 of the bat at these shaft points 92 the appropriate planes can be identified. The ergonomic handle 16 as applied to the baseball bat 90 provides batters with an extended reach for outside bails. In addition, it provides a relaxed wrist position and forearm alignment in the exact middle of the typical baseball swing as the ball crosses the plate. In this fashion, the players arms are in the most advantageous alignment to provide both maximum force as well as protect against injury.

Figure 10:
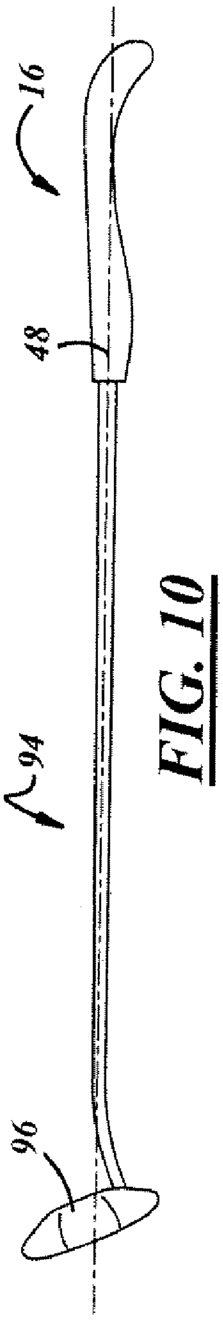
FIG. 10 is an illustration of the ergonomic sports handle illustrated in FIGS. 2 and 3, the ergonomic sports handle illustrated integrated into a golf club.
Figure 12:
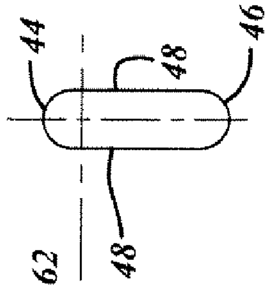
FIG. 12, is an end view illustration of the ergonomic sports handle illustrated in FIG. 10.
Figure 11:
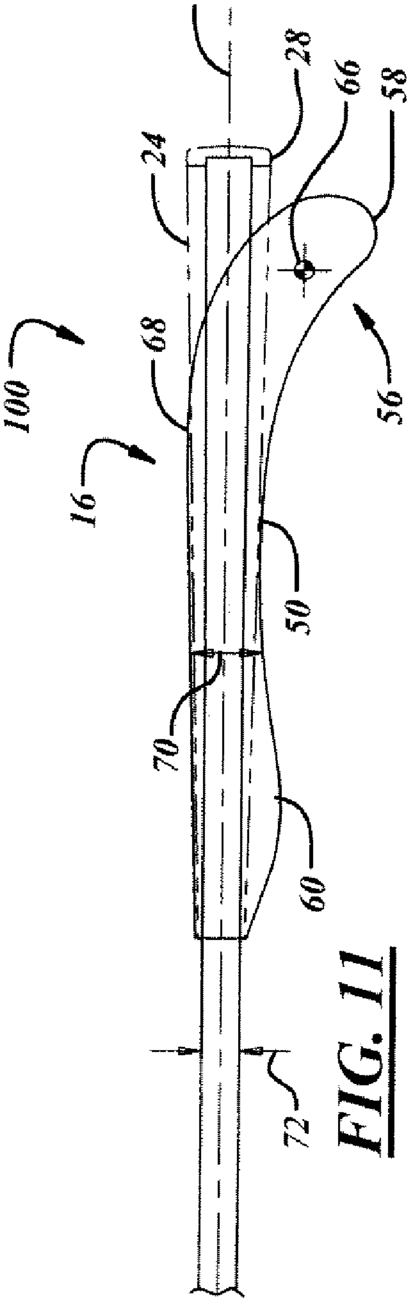
FIG. 11 is a side view illustration of the ergonomic sports handle illustrated in FIG. 10.

Referring now to FIGS. 10-12, which are illustrations of the ergonomic sports handle 16 as integrated into a golf club 94. It is contemplated that the golf club 94 may comprise drivers, irons and even putters. Although it is contemplated that the handle 16 as aforementioned described may be directly applied, it is further contemplated that this embodiment contemplate a larger degree of wrist flex (up to 30 degrees) while allowing palm centre 66 to drop approximately 1 inch or less to accommodate a greater wrist angle. This additional allowance, however, is not necessary for the proper practice of this invention as shown in FIGS. 2-4. In either case, the present invention provides considerable advantages to performance. By aligning the forearm with the shaft, the present invention may provide an increase in power and driving distance. In addition, the when utilized with flat handle side surfaces 48 as shown in FIG. 4, the ergonomic sports handle 16 provides a natural and direct connection between the golfers hand and the angle of the club face 96. In this fashion, the golfer 11 is constantly aware of the precise angle of the club face 96 with relation to his wrist throughout the swing. This improved adds an additional subconscious orientation and muscle memory during usage. It is contemplated that even in sports where the ergonomic sports handle 16 may not be officially recognized for professional play, it may be used to build muscle memory during practice as well as used by amateurs.

Figure 13:
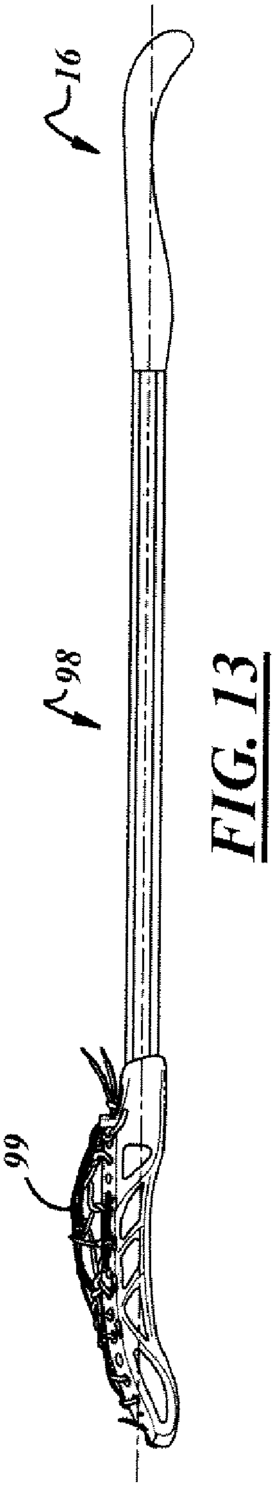
FIG. 13 is an illustration of the ergonomic sports handle illustrated in FIGS. 2 and 3, the ergonomic sports handle illustrated integrated into a lacrosse stick.

Finally, FIG. 13 is an illustration of the ergonomics sports handle to a lacrosse stick 98. It is contemplated that the flat handle side surfaces 48 be aligned with the lacrosse head 99 in order to improve handling ability in certain shots. It should be understood that in all embodiments, the present invention continues to allow the athlete 11 to choke up on any of the equipment in a traditional fashion while still providing the claimed benefits when used in the conditions where it is most advantageous.

From the foregoing, it can be seen that there has been brought to the art a new and improved sports utility handle with improved ergonomics. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A sports utility handle for use with sports equipment shaft including an upper shaft surface having an upper shaft plane, a lower shaft surface having a lower shaft plane, two side shaft surfaces having side surface planes, a shaft depth and a shaft centerline, the sports utility handle comprising:

a shaft engagement end;

a handle termination end opposite said shaft engagement end;

a upper handle surface;

a lower handle surface comprising a lower surface spline, said lower surface spline extending inwards in the direction of the lower shaft plane towards an upper surface plane in a first lower handle surface portion beginning at said shaft engagement end, said lower surface spline extending outwards in a direction back towards the lower shaft plane in a second lower handle surface portion beginning at said first lower handle surface portion and extending towards said handle termination end;

a rounded downward protrusion portion running between said upper handle surface towards said lower handle surface at said handle termination end; and two handle side surfaces running generally parallel to the two side shaft surfaces;

wherein said lower surface spline is configured to provide an ergonomic wrist grip such that the shaft centerline is generally aligned with a user forearm centerline.

2. The sports utility handle according to claim 1 further comprising:

an upper surface spline extending from the upper shaft plane in a direction away from the lower shaft plane in a first upper handle surface portion and extending back in the upper shaft plane direction in a second upper handle surface portion.

3. The sports utility handle according to claim 1 wherein:

said rounded downward protrusion portion configured to point generally in a lower shaft plane direction, said rounded downward protrusion protruding past the lower shaft plane for a distance less than the shaft depth.

4. The sports utility handle according to claim 1 wherein said shaft engagement end is integrated into a tennis racket.

5. The sports utility handle according to claim 1 wherein said rounded downward protrusion portion is sized to fit within a human palm.

6. The sports utility handle according to claim 1 wherein said lower surface spline is configured to generate a wrist rotation of less than 20 degrees when gripped.

7. The sports utility handle according to claim 1 wherein second lower handle surface portion generates a palm centre at or above the lower shaft plane.

8. The sports utility handle according to claim 1 wherein said lower surface spline is configured to generate a related wrist grip angle less than 30 degrees and a palm centre less than 0.5 inches below the shaft centerline.

9. The sports utility handle according to claim 1, wherein said first lower handle surface portion includes an initial downward bulge.

10. An piece of sports equipment comprising:
- a sports equipment shaft including an upper shaft surface having an upper shaft plane;
- a lower shaft surface having a lower shaft plane, said upper shaft plane and said lower shaft plane defining a shaft depth;
- two side shaft surfaces having side surface planes;
- a shaft centerline; and
- an ergonomic handle comprising:
  - a shaft engagement end;
  - a handle termination end opposite said shaft engagement end;
  - an upper handle surface;
  - a lower handle surface comprising a lower surface spline, said lower surface spline extending inwards from the lower shaft plane towards an upper surface plane in a first lower handle surface beginning at said shaft engagement end, said lower surface spline extending outwards in the lower shaft plane direction in a second lower handle surface beginning at said first lower handle surface and extending towards said handle termination end;
  - a rounded downward protrusion running between said upper handle surface towards said lower handle surface at said handle termination end; and
  - two handle side surfaces running generally parallel to the two side shaft surfaces;
- wherein said second handle surface portion is configured to provide a relaxed wrist grip and forearm centerline approximately parallel to said shaft centerline, and said first handle surface portion is configured to raise said user forearm centerline until it is approximately coincident with said shaft centerline.

11. The piece of sports equipment according to claim 10 further comprising:
- an upper surface spline extending from the upper shaft plane in a direction away from the lower shaft plane in a first upper handle surface portion and extending back in the upper shaft plane direction in a second upper handle surface portion.

12. The piece of sports equipment according to claim 10, wherein said sports equipment shaft comprises a tennis racket shaft.

13. The piece of sports equipment according to claim 10, wherein said sports equipment shaft comprises a fishing rod shaft.

14. The piece of sports equipment according to claim 10, wherein said sports equipment shaft comprises a baseball bat shaft.

15. The piece of sports equipment according to claim 10, wherein said sports equipment shaft comprises a golf club shaft.

16. The piece of sports equipment according to claim 10, wherein said sports equipment shaft comprises a lacrosse stick shaft.

17. An piece of sports equipment comprising:
- a sports equipment shaft including an upper shaft surface having an upper shaft plane;
- a lower shaft surface having a lower shaft plane, said upper shaft plane and said lower shaft plane defining a shaft depth;
- two side shaft surfaces having side surface planes;
- a shaft centerline; and
- an ergonomic handle comprising:
  - a shaft engagement end;
  - a handle termination end opposite said shaft engagement end;
  - an upper handle surface;
  - a lower handle surface comprising a lower surface spline, said lower surface spline extending inwards from the lower shaft plane towards an upper surface plane in a first lower handle surface beginning at said shaft engagement end, said lower surface spline extending outwards in the lower shaft plane direction in a second lower handle surface beginning at said first lower handle surface and extending towards said handle termination end;
  - a rounded downward protrusion running in a constant downward direction between said upper handle surface and said lower handle surface at said handle teimination end; and
  - two handle side surfaces running generally parallel to the two side shaft surfaces;
- wherein said second handle surface portion is configured to provide a relaxed wrist grip and forearm centerline approximately parallel to said shaft centerline, said rounded downward protrusion configured to be contained within a users palm when said relaxed wrist grip is achieved and said forearm centerline is parallel to said shaft centerline, and said first handle surface portion is configured to raise said user forearm centerline until it is approximately coincident with said shaft centerline while maintaining a wrist rotation of less than 30 degrees.

* * * * *